June 5, 1934.  W. R. HERSH  1,961,491
TRAFFIC SIGNAL FOR AUTOMOBILES AND THE LIKE
Filed Oct. 1, 1928  4 Sheets-Sheet 1

INVENTOR.
W. R. HERSH.
ATTORNEY.

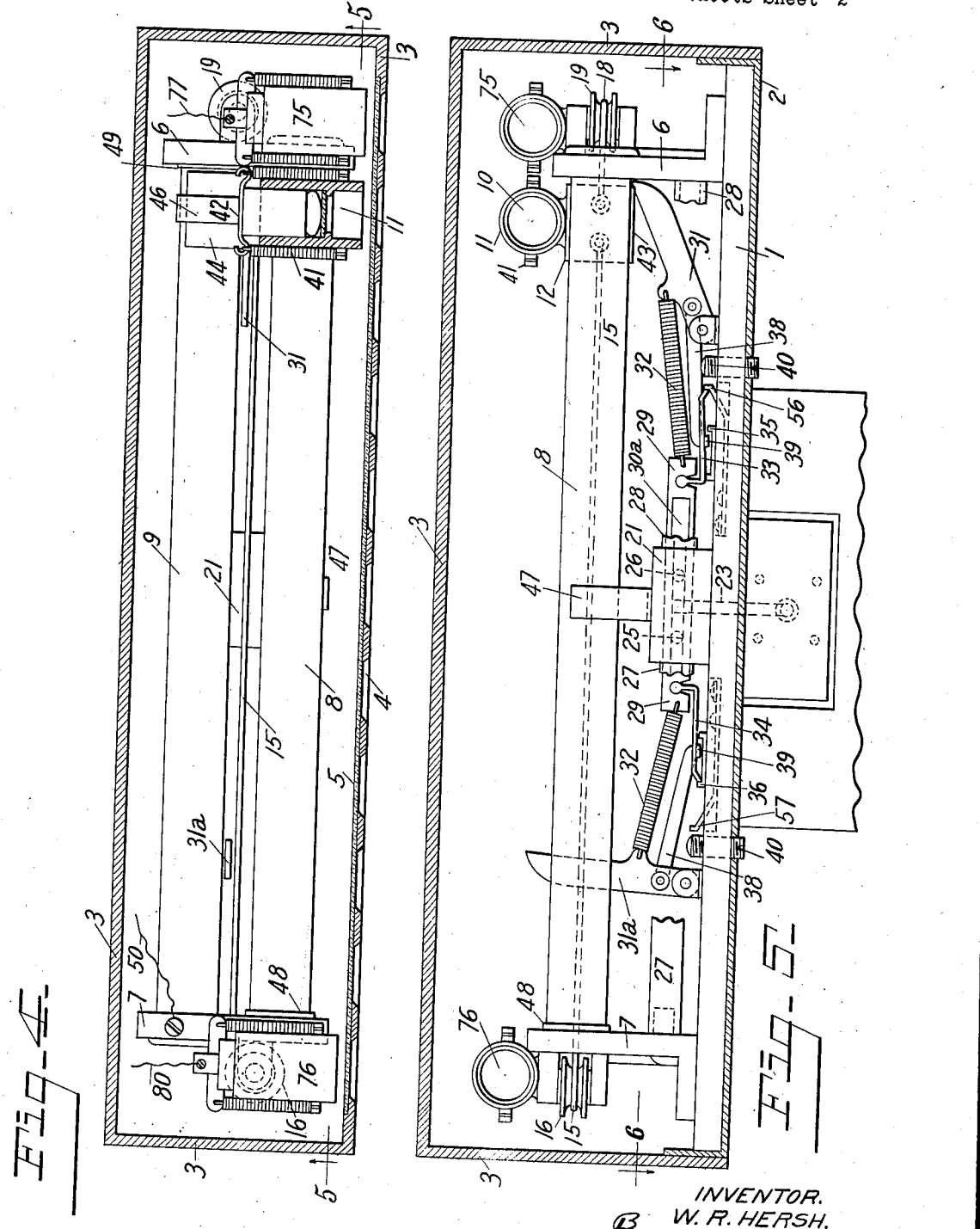

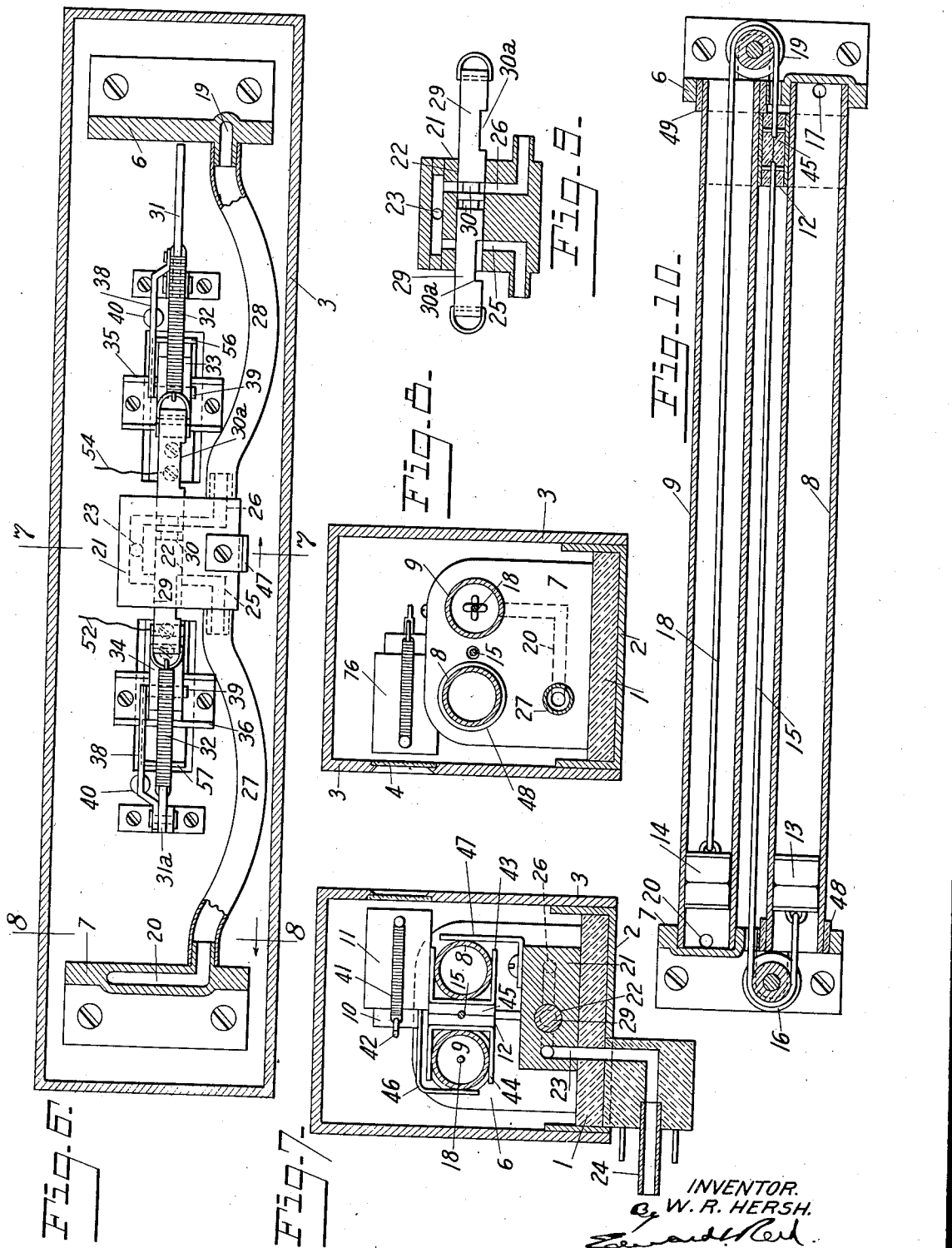

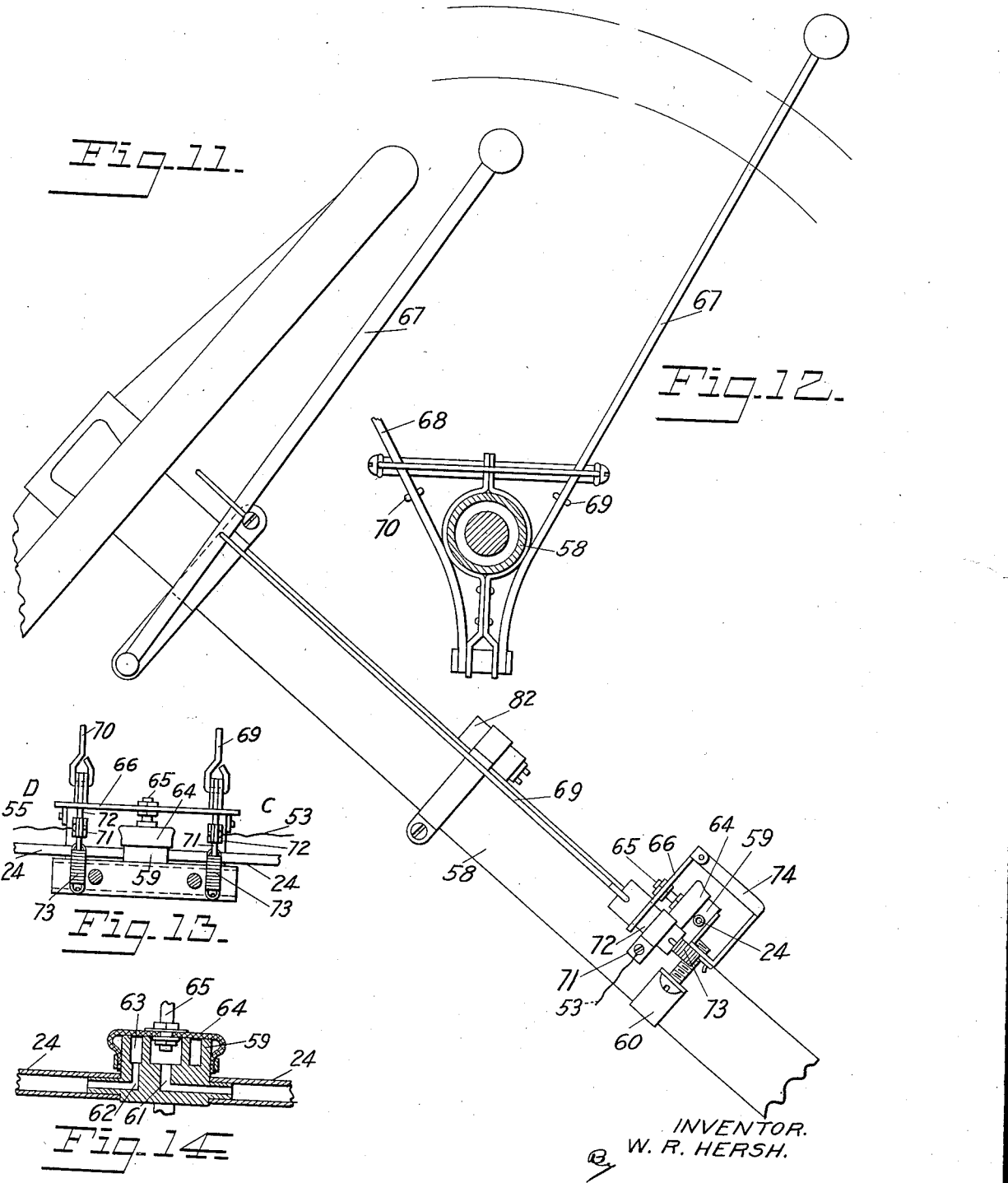

Patented June 5, 1934

1,961,491

UNITED STATES PATENT OFFICE 1,961,491

TRAFFIC SIGNAL FOR AUTOMOBILES AND THE LIKE

William R. Hersh, Dayton, Ohio

Application October 1, 1928, Serial No. 309,519

19 Claims. (Cl. 177—337)

This invention relates to traffic signals for automobiles and the like and more particularly that class of signal which indicates to the driver of a following automobile the fact that the automobile carrying the signal is about to make a turn and the direction in which that turn is to be made.

One object of the invention is to provide a signal of such a character that it will be brought forcibly to the attention of the driver of a following automobile and will definitely indicate the direction in which the turn is to be made.

A further object of the invention is to provide such a signal in which the indication will be in the nature of a light traveling in the direction in which the turn is to be made.

A further object of the invention is to provide a signal in which the operation of the signal and the direction of travel of the light will be under the control of the operator.

A further object of the invention is to provide such a signal in which the movable parts will be operated by suction, from the intake manifold of the automobile engine and in which the controlling mechanism will be so arranged that it may be easily manipulated by the driver from his seat.

Other objects of the invention will appear as the apparatus is described in detail.

Figure 1:
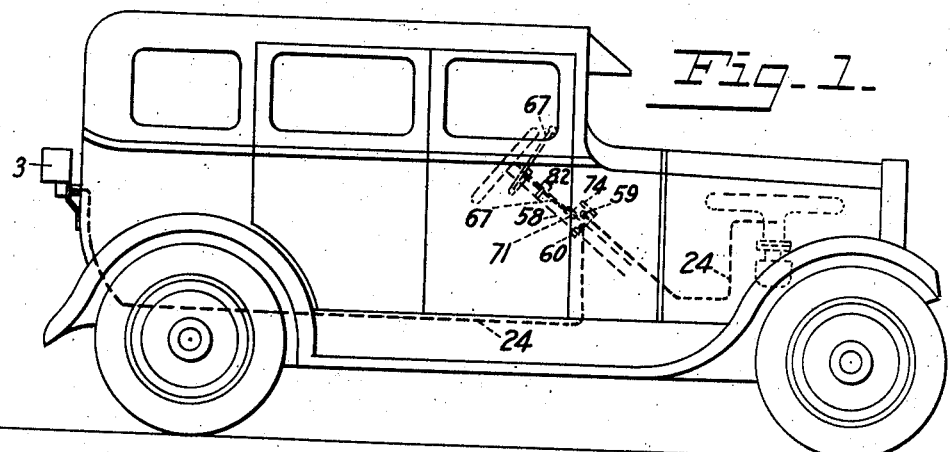
Figure 2:
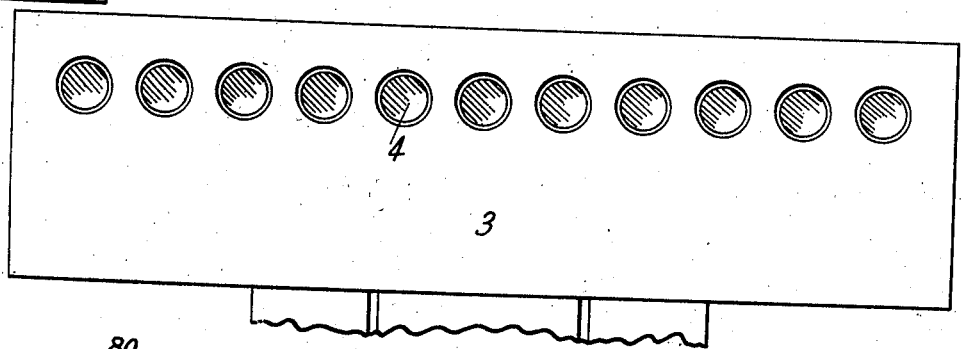
Figure 3:
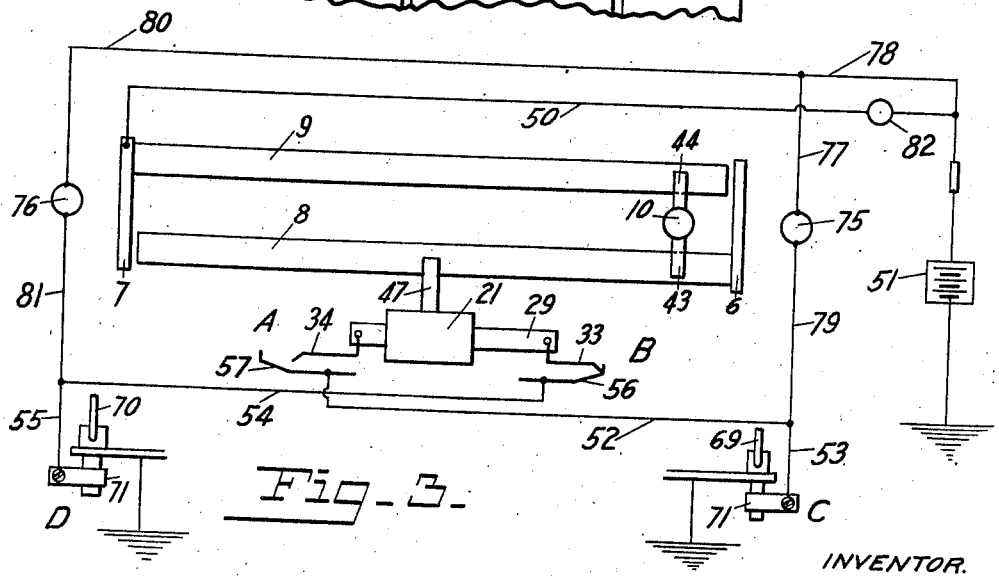

In the accompanying drawings Fig. 1 is a side elevation of an automobile showing my signal mounted thereon; Fig. 2 is a front elevation of the casing enclosing the signal mechanism; Fig. 3 is a diagrammatic view of the circuits; Fig. 4 is a horizontal sectional view taken through the upper part of the casing, showing the mechanism of the signal in plan; Fig. 5 is a vertical section taken on the line 5—5 of Fig. 4; Fig. 6 is a horizontal section taken on the line 6—6 of Fig. 5; Fig. 7 is a transverse section taken on the line 7—7 of Fig. 6; Fig. 8 is a transverse section taken on the line 8—8 of Fig. 6; Fig. 9 is a sectional detail view of the reversing valve; Fig. 10 is a sectional detail view of the suction operated device; Fig. 11 is a side elevation of the controlling mechanism mounted on the steering wheel column; Fig. 12 is a plan view of the controlling levers, one of which is broken away; Fig. 13 is a front elevation of the master valve and master switches forming part of the controlling mechanism; and Fig. 14 is a sectional detail view of the master valve.

In these drawings I have illustrated one embodiment of my invention but it will be understood that this particular embodiment has been chosen for the purposes of illustration only and that the mechanism may take various forms and may be arranged and controlled in various ways without departing from the spirit of the invention.

In that form of the invention here illustrated, the signal comprises a lamp mounted for movement transversely to the automobile and means are provided for reversing the direction of movement of the lamp when it reaches the limit of its movement in either direction, thus causing it to travel alternately in opposite directions. Means are provided for automatically controlling the circuit through the lamp so that this circuit will be closed and the lamp lighted when it travels in one direction only, thus when the lamp travels in the direction in which the turn is to be made the circuit will be closed and the lamp lighted. When it reaches the limit of its movement in that direction the circuit will be broken and the darkened lamp returned to its initial position where the circuit will be again closed and the lighted lamp caused to again travel in the direction of the turn. The mechanism for operating the lamp and for controlling the direction of travel during which it shall be lighted are under the control of the driver of the automobile.

As here shown, the several parts of the signal are mounted on a supporting structure which comprises a base 1, preferably of wood or other suitable material. This base and the parts mounted thereon are enclosed in a casing which, in the present instance, comprises two parts. The lower part 2 is rigidly secured to the base 1 and the upper part 3 is removably mounted on the lower part so that it can be removed to permit access to be had to the signal mechanism. The upper part 3 of the casing is provided with a sight opening 4 extending lengthwise thereof and preferably closed by transparent material, such as a strip of glass 5. If desired, the sight opening may be divided into a plurality of parts or spaced windows, as shown in Figs. 1 and 4, but this is not necessary to the proper operation of the signal.

Mounted on the base 1, near the respective ends thereof, are frame members or brackets 6 and 7 on which are mounted two tubular members 8 and 9. The traveling lamp, which is shown at 10, is preferably mounted for movement lengthwise of the tubular members and, in the present instance, is supported by those tubular members. In the arrangement illustrated the lamp is mounted in an elongated shell 11, the forward end of which is open and arranged adjacent to the sight opening 4, it being understood that the tubular members, which constitute guides for the lamp, are mounted parallel with the sight opening and in such relation thereto that the lamp will travel along the sight opening in line therewith. The tubular shell 11 of the lamp is supported on a carriage 12 which is slidably mounted upon the tubular members 8 and 9. Mounted in the tubular members 8 and 9, which constitute cylinders, are pistons 13 and 14 which are operatively connected with the carriage 12. In the present arrangement, a flexible member or cable 15 is connected with the piston 13 and extends about a guide or pulley 16 at one end of the tubular member 8 and is connected at its other end with the carriage 12. That end of the tubular member 8 opposite the guide 16 is provided with a port or suction conduit 17, by means of which it may be connected with a suitable source of suction, such as an intake manifold of the automobile engine. The piston 14 is connected with one end of a flexible member or cable 18 which extends about a guide or pulley 19 arranged at that end of the tubular member 9 remote from the guide 16 and the other end of this cable is connected with the carriage 12. The tubular member 9 is provided at that end opposite the guide 19 with a port or suction conduit 20 by means of which it may be connected with a source of suction. It will be apparent, therefore, that the piston 13 will move the lamp in one direction and the piston 14 will move the lamp in the other direction.

The operation of the pistons and consequently the movement of the lamp may be controlled in any suitable manner but preferably a reversing valve is interposed between the tubular members and the main suction line leading to the engine. As here shown, this reversing valve comprises a casing 21 having a valve chamber 22 provided between its ends with an inlet port 23 with which is connected a conduit 24, which may be in the nature of a flexible tube leading to the intake manifold of the engine, as shown in dotted lines in Fig. 1. Near each end thereof the valve chamber is provided with ports 25 and 26, the port 25 being connected by a flexible tube 27 with the suction conduit 20 for the tubular member 9, this conduit being in the present instance formed in the bracket 7. The valve port 26 is connected by a flexible conduit 28 with the suction conduit 19 for the tubular member 8, this suction conduit also being shown as formed in the bracket 6. Mounted in the valve chamber 22 is a valve member 29 having in its central portion two annular ports 30 so arranged that when the valve member is in one position, as shown in Fig. 9, the main suction port 23 will be connected through the port 26 and tube 28 with the tubular member 8, and when the valve member is moved to its other position the port 23 will be connected with the tubular member 9, through the port 25 and the tube 27. The valve member is also provided with ports 30a so arranged that when one of the ports, 25 or 26, is connected with the main suction port 23 the other of said ports, 25 or 26, will be connected with the atmosphere.

The connection of the suction line 24 with the intake manifold of the engine is under the control of the driver and this control may be either a direct control or through the steering mechanism. In the present instance, the control is a direct one as will be hereinafter described. The operation of the reversing valve is controlled by the movement of the traveling lamp and to this end a valve actuating device is arranged to be engaged and operated by the carriage 12 as it approaches the limit of its movement in either direction. The valve actuating device may take various forms and in the arrangement here shown I have mounted on the base 1 two trip arms 31 and 31a. These trip arms are arranged on the opposite sides of the reversing valve and are preferably pivotally mounted on the base. The upper end of each trip arm, when in its normal position, extends into the path of the carriage 12 and is so located that it will be engaged by that carriage as the latter approaches the limit of its movement. Each trip arm is connected with the adjacent end of the valve member 29 by a spring 32 and the valve member is held against movement by that spring until the lamp carriage has completed its movement. For this purpose I have mounted on the respective ends of the valve member movable stops, such as pivoted arms 33 and 34, the free ends of which are slightly depressed and adapted to engage fixed stops 35 and 36 on the base 1 when the corresponding trip arms are in their normal or inoperative positions. As shown in Fig. 5, the locking arm 34, connected with the left hand end of the valve member 29, is in locking engagement with its cooperating stop 36. When the carriage 12 approaches the left hand limit of its movement it will engage the trip arm 31 and move the latter about its axis. The valve member is locked against movement by the locking arm 34 and the spring will yield to permit the movement of the trip arm. Just as the carriage 12 reaches the limit of its movement to the left the locking arm 34 is tripped to release the valve and the latter is moved quickly to its reversed position by the contraction of the spring 32. The locking arm 34 is actuated to release the valve by means of an arm 38 pivotally mounted on the trip arm and having at its free end a laterally extending part or finger 39 to which is arranged beneath the locking arm. Mounted in the base 1 beneath the arm 38 is a projection, here shown as a screw threaded stud 40, which is so arranged that the movement of the trip arm about its axis, by the carriage 12, will cause the arm 38 to engage the upper end of the stud and fulcrum thereon so that the finger 39 at the free end of the arm will lift the locking arm 34 out of engagement with the stop 36, as shown at the right hand end of Fig. 5. As the carriage is moved away from the trip arm the spring 32 will restore the trip arm to its upright or normal position.

The circuit for the traveling lamp may be arranged and controlled in any suitable manner but preferably the circuit for the lamp is automatically broken and closed upon each operation of the reversing valve so that the circuit will be closed through the lamp when the latter moves in one direction only. The breaking or closing of the circuit for the lamp when the lamp is moving in a given direction is under the control of the driver so that by the manipulation of the controlling mechanism he can cause the light to travel in the desired direction. In the present arrangement, the tubular members or cylinders 8 and 9 are of conducting material and constitute a part of the circuit. The lamp 10 is electrically connected with the tubular shell 11, in the present instance by means of retaining springs 41 and a cross bar 42 which engages the central contact in the lamp base, the bar and springs serving to retain the lamp in the casing as well as to electrically connect the same therewith. The carriage 12 comprises two metallic parts 43 and 44 which are rigidly connected one to the other by insulating material 45. The part 43 of the carriage is secured to the lamp shell 11 and is electrically connected with that shell and with the lamp. A contact member 46 is connected with the other contact on the lamp base and has sliding contact with the tubular member 9. Thus the two sides of the lamp circuit are connected with the respective tubular members. The tubular member 8 is electrically connected with the valve casing 21 by a contact member 47 secured to the valve casing and having contact with the tubular member 8. The two tubular members 8 and 9 are insulated one from the other. As here shown, the tubular member 8 is insulated from the bracket 7, as shown at 48, and the tubular member 9 is insulated from the bracket 6, as shown at 49, and inasmuch as the brackets are insulated one from the other by the base 1 of insulating material it will be apparent that the tubular members are insulated one from the other.

Referring now to the circuit diagram of Fig. 2, it will be noted that the tubular member 9 is connected by a conductor 50 with a suitable source of electrical energy, such as a battery 51, the other side of which is grounded on the frame of the machine. Thus the battery is connected through the conductor 50, tubular member 9, carriage 12, tubular member 8, contact member 47, and valve casing 21, with the valve member 29. This valve member is connected with circuit breakers and closers which are designated as a whole by the reference characters A and B. The circuit breaker and closer A is connected by conductors 52 and 53 with a master switch which is designated as a whole by the letter C. The circuit breaker and closer B is connected by conductors 54 and 55 with a master switch which is designated as a whole by the letter D. Both master switches are in the present instance, grounded on the frame of the automobile. In the present arrangement, the circuit breakers and closers A and B are actuated by the reversing valve and I have therefore utilized locking arms 33 and 34 as parts of the respective circuit breakers and closers. Mounted on the base 1 are stationary contact members 56 and 57 which are connected respectively with the conductors 54 and 52. These fixed contact members are so arranged that when the reversing valve is released and actuated by the spring 32 one of the locking members will move into engagement with, and establish electrical contact with, the corresponding fixed contact member 57. In the present instance, the fixed contact members have upturned end portions which are engaged by the locking arms and thus form stops to limit the movement of the valve member, as well as to provide a good electrical connection between the parts. Thus it will be apparent that when the lamp carriage is moving in one direction the circuit therethrough will be closed through one of the circuit breakers and closers, A or B, and when the lamp carriage is moving in the other direction the circuits through the lamp will be closed through the other circuit breaker or closer A, or B. In order to determine the direction of movement during which the lamp shall be lighted the master switches C and D are provided.

With the several parts in the positions shown in the drawing it will be noted that the lamp has just completed its travel to the right, in the drawing, and that the reversing valve has been shifted to connect the tubular member or cylinder 8 with the suction line, so that the lamp will now be moved to the left by the action of the piston 13. The circuit breaker and closer B is closed and the circuit breaker and closer A is open. If the master switch D is closed the circuit will be completed through the lamp, circuit breaker and closer B, and master switch D to the ground and thence back to the battery 51, thus causing the lamp to be lighted as it travels to the left. When the lamp completes its movement to the left the operation of the reversing valve will open the circuit breaker and closer B and close the circuit breaker and closer A but inasmuch as the circuit breaker and closer A is connected with the master switch C, which would be open when the master switch D is closed, the circuit through the lamp is broken and the lamp will be dark as it travels to the right. When it completes its travel to the right the parts will be restored to the positions shown in the drawings and the lamp will be again lighted as it travels to the left.

The means for controlling the mechanism which moves the lamp may take various forms but, as has been stated, it preferably comprises a master valve to control the connection between the operating mechanism and the engine and two master switches or circuit breakers and closers to determine the direction of movement during which the lamp shall be lighted. It is also preferable that the controlling mechanism shall be of such a character that a single operation will close a selected master switch and open the master valve. In the present instance, this controlling mechanism is adapted to be mounted on the steering column 58 of the automobile and the master valve comprises a valve casing 59 which may be secured to the steering column by a clamp 60. The valve casing has a central inlet port 61 which is connected with one side of the suction line 24 and second port 62 which is connected with the other side of the suction line. The port 62 is connected with an annular channel 63 which opens through the upper end of the valve casing and surrounds the upper end of the port 61, which also opens through the upper end of the valve casing. These ports are normally closed by a cap 64 slidably mounted on the valve casing and connected by a rod 65 with an actuating member or cross head 66 which is manually operated. Whenever the actuating member is lifted the master valve will be opened. The actuating member or cross head 66 is operatively connected with two separate levers 67 and 68 mounted on the steering column and having their free ends arranged near the periphery of the steering wheel where they may be readily actuated by the hand of the driver. The operating levers 67 and 68 are connected by rods 69 and 70 with the actuating member 66. Preferably the connection between the connecting rods 69 and 70 and the actuating member 66 is of such a character that the movement of either operating lever will close the corresponding master switch C or D and also open the master valve. As here shown, each master switch comprises a contact member 71 rigidly secured to a bar of insulating material 72 slidably mounted in the actuating member 66 and connected by a spring 73 with a part carried by the clamp 60, this spring tending to hold the contact member 71 normally out of engagement with the actuating member or cross head 66, which is grounded on the steering column and constitutes the fixed contact member of the switch. In the present instance, the cross head or actuating member 66 is pivotally mounted at its edge on a bracket 74 carried by the clamp 60 but obviously it may be mounted in any suitable manner. It will be apparent, therefore, that when either of the operating levers is actuated the corresponding master switch will be first closed and the master valve then opened, thus initiating the operation of the signal mechanism and causing the light to travel in the selected direction.

In the present arrangement, I have also provided two stationary lamps, arranged one at each end of the line of travel of the movable lamp, these lamps being preferably of different colors. The stationary lamps are mounted in tubular shells similar to the shell 11 and are arranged in line with the sight opening 4 at the ends thereof, beyond the limits of travel of the movable light. In the present construction, these lamps are shown at 75 and 76, the right hand light, 75, preferably having a green lens and the left hand light, 76, preferably having a red lens. The stationary lamp 75 is connected by conductors 77 and 78 with the battery and by a conductor 79 and the conductor 53 with the master switch C, while the lamp 76 is connected by conductors 80 and 78 with the battery and by conductors 81 and 55 with the master switch D. Consequently when the master switch D is closed and the movable light travels to the left the lamp 76 will be lighted and when the master switch C is closed and the movable light travels to the right the lamp 75 will be lighted. I have also interposed in the circuit of the movable lamp a tell tale light 82, which may be mounted on the steering column, as shown in Fig. 11, and which will be lighted whenever the traveling lamp is lighted, thus indicating to the driver whether or not the traveling lamp is lighted.

It will be observed that when both operating levers 67 and 68 are elevated and both master switches are closed the circuits will be closed through both stationary lamps, 75 and 76, and will be closed through the traveling lamp during its movement in both directions, thus illuminating both stationary lamps and the traveling lamp so long as both levers are held in their elevated positions and enabling the device to be utilized as a stop signal as well as a direction signal.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a traffic signal for automobiles and the like, a pair of parallel tubular members, a piston in each tubular member, a lamp, means for supporting said lamp for movement lengthwise of said tubular members, means for connecting said lamp with both pistons, a suction line, a reversing valve to alternately connect said tubular members with said suction line, trip arms arranged near the respective limits of travel of said lamp and adapted to be engaged by a part connected with said lamp, springs connecting said trip arms with the respective ends of said reversing valve, means to hold said reversing valve against movement by the movement of that trip arm which is actuated by said lamp, and means controlled by the continued movement of said trip arm to release said reversing valve for movement by the spring of said trip arm.

2. In a traffic signal for automobiles and the like, an electric lamp, means for supporting said lamp for bodily movement in a substantially straight line transverse to said automobile, power operated means for causing said lamp to move alternately in opposite directions, and means for causing the light of said lamp to appear successively at a plurality of points along said line when said lamp moves in one direction and for preventing the appearance of said light when said lamp moves in the other direction.

3. In a traffic signal for automobiles and the like, a supporting structure, an electric lamp, means for supporting said lamp for bodily movement along said supporting structure, means for moving said lamp alternately in opposite directions, a circuit for said lamp, and means controlled in accordance with the movement of said lamp along said supporting structure for closing the circuit through said lamp when said lamp is moved in one direction and for interrupting said circuit when said lamp is moved in the other direction, and selective means for determining in which direction of movement of said lamp said circuit shall be closed.

4. In a traffic signal for automobiles and the like, a housing having a sight opening, a lamp, a support for said lamp mounted in said housing for bodily movement lengthwise of said sight opening, two cylinders, separate pistons mounted in the respective cylinders, means for operatively connecting said lamp support with both pistons to cause said lamp to be moved in one direction by one piston and to be moved in the opposite direction by the other piston, and means for alternately connecting said cylinders with a source of suction.

5. In a traffic signal for automobiles and the like, a housing having a sight opening extending transversely to said automobile, an electric lamp, a support for said lamp mounted in said housing for bodily movement along said sight opening, two cylinders, pistons mounted in the respective cylinders, means for operatively connecting said lamp support with both pistons to cause said lamp to be moved in one direction by one piston and to be moved in the opposite direction by the other piston, valve means for alternately connecting said cylinders with a source of suction, a circuit for said lamp, means for closing the circuit through said lamp when one of said cylinders is connected with said source of suction, and for breaking said circuit when the other cylinder is connected with said source of suction, and means for actuating said valve means to reverse the connections of said cylinders with said source of suction when said lamp reaches either limit of its travel.

6. In a traffic signal for automobiles and the like, a pair of parallel tubular members arranged side by side, a separate piston in each tubular member, a lamp, means for supporting said lamp for movement lengthwise of said tubular members, means for connecting said lamp with both of said pistons and for connecting said pistons one to the other for simultaneous movement in the same direction, a suction line, a reversing valve to alternately connect said tubular members with said suction line, and means controlled in accordance with the movement of said lamp to actuate said reversing valve when said lamp has reached the limit of its movement in either direction.

7. In a traffic signal for automobiles and the like, a pair of parallel tubular members arranged side by side, a separate piston in each tubular member, a lamp support slidably mounted on said tubular members, a lamp carried by said support, flexible members for connecting said lamp support with both pistons and for connecting said pistons one to the other, a suction line, a reversing valve to alternately connect said tubular members with said suction line, and means actuated by said lamp support to cause said reversing valve to be actuated when said lamp support reaches the limit of its movement in either direction.

8. In a traffic signal for automobiles and the like, a housing having a sight opening extending transversely to said automobile, a pair of tubular members extending lengthwise of said sight opening, a piston in each tubular member, a lamp support mounted in said housing for movement lengthwise of said tubular members, a lamp carried by said support and movable therewith along said sight opening, means for connecting said lamp support with both pistons, a suction line, a reversing valve to alternately connect said tubular members with said suction line, and means actuated by said lamp support to actuate said reversing valve when the lamp has reached the end of said sight opening.

9. In a traffic signal for automobiles and the like, a pair of parallel tubular members, a piston in each tubular member, a lamp support mounted for bodily movement lengthwise of said tubular members, an electric lamp carried by said support, means for connecting said lamp support with both pistons for movement in one direction by one piston and in the other direction by the other piston, a suction line, a reversing valve to alternately connect said tubular members with said suction line, two circuits for said lamp, a circuit breaker and closer in each circuit, means actuated by said lamp support at the respective limits of its travel to alternately open and close said circuit breakers and closers and to actuate said reversing valve, and controlling means separate from said circuit breakers and closers to open one of said circuits and close the other of said circuits, whereby the alternate opening and closing of said circuit breakers and closers will cause one of said circuits to be closed through said lamp while it moves in one direction and will cause both circuits to be opened while the lamp moves in the other direction.

10. In a traffic signal for automobiles and the like, a supporting structure, a lamp support mounted for movement along said supporting structure, an electric lamp carried by said support, suction operated means for moving said lamp support alternately in opposite directions, means controlled by the movement of said lamp support to reverse the operation of said suction operated means, a master valve to control the connection of said suction operated means with a source of suction, two circuits for said lamp, a circuit breaker and closer in each circuit, means controlled by the movement of said lamp support to open one of said circuit breakers and closers to close the other circuit breaker and closer when said lamp reaches the limit of its travel in one direction and to close the first mentioned circuit breaker and closer and open the last mentioned circuit breaker and closer when the lamp reaches the limit of its travel in the other direction, a master circuit breaker and closer in each circuit, and a device to open said master valve and to close a selected one of said master circuit breakers and closers.

11. In a traffic signal for automobiles and the like, a supporting structure, an electric lamp, means for supporting said lamp for bodily movement with relation to said supporting structure, means for moving said lamp alternately in opposite directions, two circuits for said lamp, a master circuit breaker and closer in each circuit, a second circuit breaker and closer in each circuit, and means controlled by the direction of movement of said lamp to alternately open and close said second circuit breakers and closers and to maintain the same open and closed, respectively, throughout the movement of said lamp in one direction.

12. In a traffic signal for automobiles and the like, a supporting structure, a lamp, means for supporting said lamp for bodily movement with relation to said structure, power operated means for imparting movement to said lamp, means for automatically reversing the direction of movement of said lamp, a circuit for said lamp, means controlled by said reversing means to close the circuit through said lamp when said lamp is moved in one direction and to break said circuit when said lamp is moved in the other direction, and means under the control of the driver for determining in which direction of movement the lamp circuit shall be closed.

13. In a traffic signal for automobiles and the like, a pair of parallel tubular members of conducting material, insulated one from the other, a piston in each tubular member, a suction line, means comprising a reversing valve for alternately connecting said tubular members with said suction line, an electric lamp, means for slidably supporting said lamp on said tubular members and electrically connecting the same with both of said members, means for connecting one of said tubular members with a source of electrical current, means for electrically connecting the other of said tubular members with said reversing valve, two circuit breakers and closers connected with said reversing valve and with said source of electrical current, said circuit breakers and closers being arranged to be alternately opened and closed by the movement of said reversing valve, means controlled by the movement of said lamp supporting means to actuate said reversing valve when said lamp reaches the limit of its movement in one direction or the other, and master switches in circuit with the respective circuit breakers and closers.

14. In a traffic signal for automobiles and the like, an electric lamp, means for supporting said lamp for bodily movement, means for moving said lamp alternately in opposite directions, two circuits for said lamp, a circuit breaker and closer in each circuit, means controlled by the movement of said lamp to alternately open and close said circuit breakers and closers and to maintain the same open and closed, respectively, throughout the movement of said lamp in one direction, a master circuit breaker and closer in each circuit, a stationary lamp in each circuit so connected with the respective master circuit breakers and closers as to be controlled thereby independently of the first mentioned circuit breakers and closers, said stationary elements being arranged near the respective limits of movement of said movable lamp.

15. In a traffic signal for automobiles and the like, an elongated supporting structure, a lamp support slidably mounted on said supporting structure, means for imparting reciprocatory movement to said lamp support, a lamp carried by said lamp support, a circuit for said lamp, and means controlled in accordance with the movement of said lamp support to close said circuit when said lamp support is moved in one direction and to open said circuit when said lamp support is moved in the other direction.

16. In a traffic signal for automobiles and the like, an elongated supporting structure, a lamp support slidably mounted on said supporting structure, means for imparting reciprocatory movement to said lamp support, a lamp carried by said lamp support, a circuit for said lamp, and means actuated by said lamp support to close said circuit when said lamp support is near the limit of its movement in one direction and to open said circuit when said lamp support is near the limit of its movement in the other direction.

17. In a traffic signal for automobiles and the like, a tubular member, a lamp support slidably mounted on said tubular member, a piston in said tubular member, means for operatively connecting said piston with said lamp support, means for connecting said tubular member with a source of suction to actuate said piston, means controlled in accordance with the movement of said lamp support to reverse the direction of movement of said piston, a lamp carried by said lamp support, a circuit for said lamp, and means controlled in accordance with the movement of said lamp support to close said circuit when said lamp support is moved in one direction and to open said circuit when said lamp support is moved in the other direction.

18. In a traffic signal for automobiles and the like, a tubular member, a lamp support slidably mounted on said tubular member, a piston in said tubular member, means for operatively connecting said piston with said lamp support, means including a reversing valve for connecting said tubular member with a source of suction to actuate said piston, means to actuate said valve to reverse the direction of movement of said piston, a lamp carried by said lamp support, a circuit for said lamp, a switch in said circuit, means for connecting said switch with said valve for operation thereby, and means controlled by the movement of said lamp support to actuate said valve.

19. In a traffic signal for automobiles and the like, a supporting structure, a lamp, means for supporting said lamp for reciprocatory movement with relation to said structure, means for actuating said lamp and causing the light thereof to appear successively at a plurality of points on said structure during its movement in one direction, for extinguishing said light during the movement of said lamp in the other direction and for again causing said light to appear successively at said plurality of points when said lamp is again moved in the first mentioned direction, and means under the control of the driver for determining in which direction of movement the lamp is illuminated.

WILLIAM R. HERSH.